United States Patent [19]

Blackwell, Jr.

[11] 4,130,377

[45] Dec. 19, 1978

[54] HELICOPTER BLADE AND ROTOR

[75] Inventor: Robert H. Blackwell, Jr., Derby, Conn.

[73] Assignee: United Technologies Corporation, Hartford, Conn.

[21] Appl. No.: 815,613

[22] Filed: Jul. 13, 1977

[51] Int. Cl.² .................. B64C 27/38; B64C 27/46
[52] U.S. Cl. .................. 416/132 R; 416/138; 416/141; 416/228; 416/240
[58] Field of Search .............. 416/132 R, 141, 138 A, 416/140 A, 134 A, 228 A, 240

[56] References Cited

U.S. PATENT DOCUMENTS

| 3,200,887 | 8/1965 | Ballauer | 416/141 |
| 3,232,349 | 2/1966 | Ballauer | 416/132 |
| 3,558,082 | 1/1971 | Bennie | 416/132 |
| 3,589,831 | 6/1971 | Lemnios | 416/132 X |
| 3,721,507 | 3/1973 | Monteleone | 416/228 A |
| 3,822,105 | 7/1974 | Jepson | 416/228 A |
| 3,902,821 | 9/1975 | Robinson | 416/132 |
| 3,926,536 | 12/1975 | Ciastula et al. | 416/141 X |
| 3,999,886 | 12/1976 | Ormiston et al. | 416/141 X |
| 4,028,003 | 6/1977 | Krauss | 416/132 R |

FOREIGN PATENT DOCUMENTS 418212  10/1934  United Kingdom .................. 416/141

Primary Examiner—Everette A. Powell, Jr.
Attorney, Agent, or Firm—Vernon F. Hauschild

[57] ABSTRACT

A torsionally compliant helicopter blade having its aerodynamic center axis positioned selectively forward of its center of gravity and elastic axes throughout a selected portion of the blade span so that, during operation, the blade will experience airloading which will induce two per rev torsional deflection of the blade to thereby improve rotor performance by reducing the total power required to drive the rotor.

10 Claims, 14 Drawing Figures

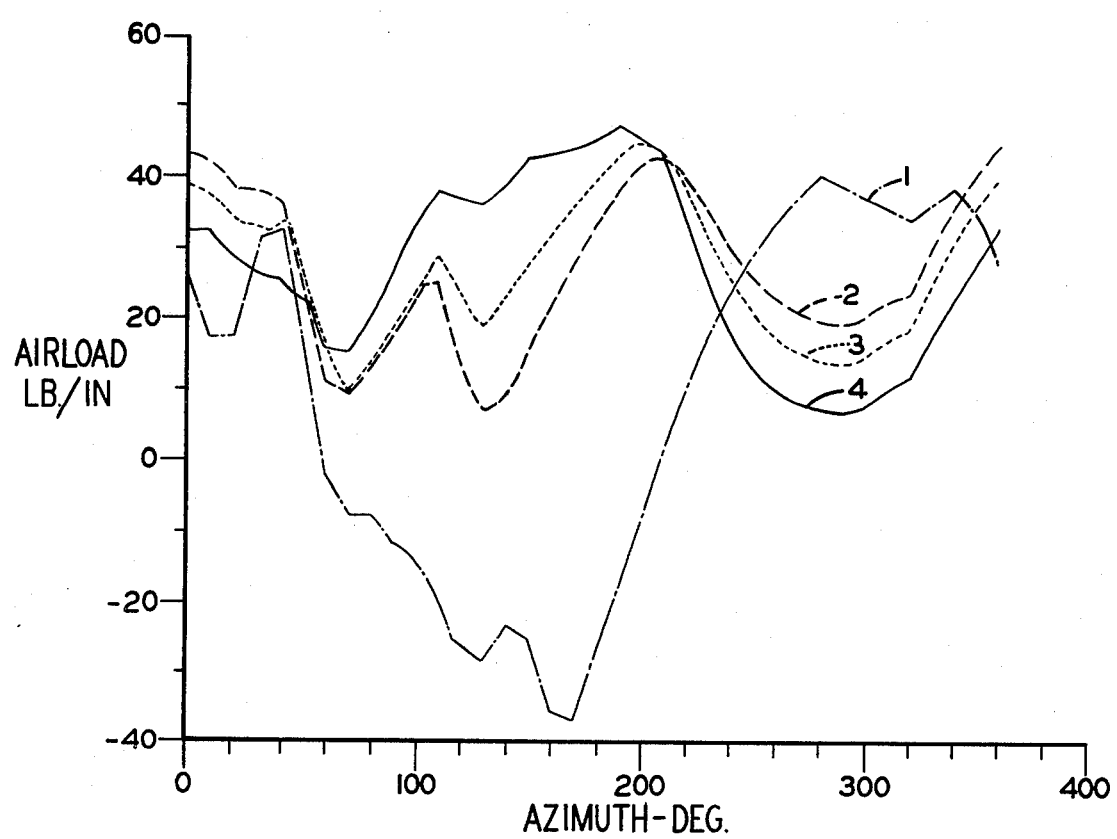

HELICOPTER BLADE AND ROTOR

The invention herein described was made in the course of or under a contract or subcontract thereunder, with the Department of the Army.

BACKGROUND OF THE INVENTION

1. Field of Invention

This invention relates to helicopter blades and rotors which are fabricated to improve blade and rotor performance and which do so without the need of additional hardware.

2. Description of the Prior Art

In the helicopter rotor art, it has been suggested that rotor performance might be improved by varying blade pitch at a second or higher harmonic of rotor speed and, while attempts have been made to so improve rotor performance, all such attempts known today require additional hardware above and beyond the normal blade and rotor control hardware. In one such construction, a swashplate was used which was not only tiltable but which was selectively shaped so that normal pitch changes could be imparted to a conventional non-torsionally compliant helicopter blade through the usual pitch horn arrangement and so that second pitch change commands could be imparted to the blade due to the selectively shaped swashplate to thereby produce a desired number of pitch changes over the entire span of the conventional blade in a rotor revolution. In a second prior art arrangement, a torsionally compliant blade was used with conventional pitch horn pitch change input and a second set of hardware located interior of the blade and operable separately from the pitch horn input to control a tab at the blade tip to produce torsional deflections of the blade as desired during blade rotation. It should be noted that in both of these prior art constructions extra hardware and a second pitch change system was required to produce pitch change above and beyond the normal pitch horn input. This necessarily introduces undesirable added weight and complication to the conventional helicopter blade and rotor.

SUMMARY OF THE INVENTION

A primary object of the present invention is to provide an improved helicopter blade and rotor in which the blade will be aerodynamically induced to have torsional responses at selected azimuth stations so as to improve rotor efficiency and reduce the overall power required to drive the rotor, more particularly, to thereby produce two per rev torsional response to produce maximum blade pitch increase at approximately the 0° and 180° azimuth stations of the helicopter and to produce minimum pitch at approximately the rotor 90° and 270° azimuth stations.

In accordance with the present invention, a helicopter blade is fabricated to be torsionally compliant and to have its aerodynamic center axis positioned a selected chordwise distance forward of the blade center of gravity and elastic axes throughout a selected portion of the blade span or radius so as to produce two per rev torsional deflection of the blade, and to do so by means of aerodynamic loading of the blade and not by the introduction of additional hardware, and preferably with reduced control loads.

BRIEF DESCRIPTION OF THE DRAWINGS

FIG. 5 is a series of graphs of the airload acting upon a helicopter rotor blade in rotation throughout its full azimuth at selected span or radial stations along the blade.

DESCRIPTION OF THE PREFERRED EMBODIMENT

Figure 1:
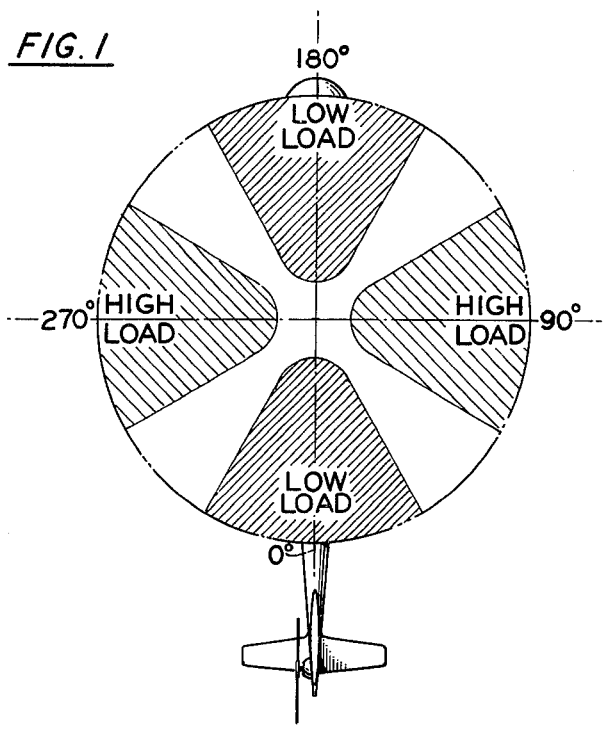
FIG. 1 is a view looking down upon a helicopter to illustrate the regions of high loading near the 90° and 270° azimuth stations and the regions of relatively low loading near the 0° and 180° azimuth stations.
Figure 2A:
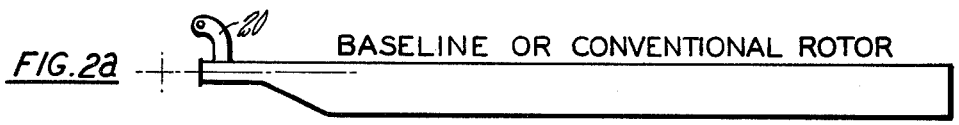
FIG. 2a is a showing of a conventional or baseline helicopter rotor blade of the type used in modern helicopters and which is not torsionally compliant.
Figure 2B:
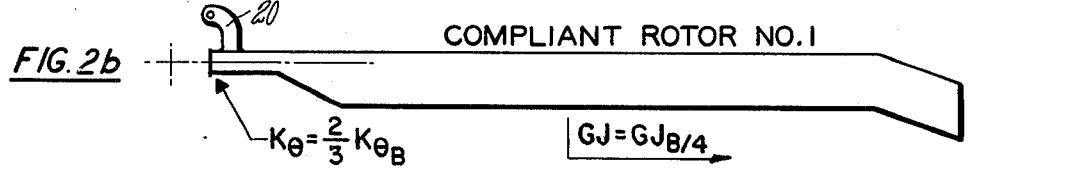
FIG. 2b is a showing of a torsionally compliant rotor blade with tip sweep but without the selected axes offset taught herein and with the degree of torsional compliance and control system stiffness indicated.
Figure 2C:
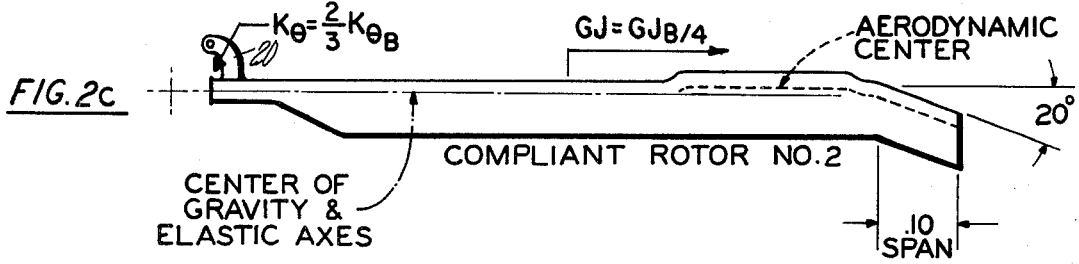
FIG. 2c is a showing of my preferred torsionally compliant rotor blade with tip sweep and selected axes offset and with the degree of torsional compliance and control system stiffness indicated.

It can be shown that in a conventional helicopter rotor at moderate to high advance ratios (M=0.2 to 0.5) as best shown in FIG. 1, the blades are heavily loaded at the 90° azimuth station and at the 270° azimuth station but are relatively unloaded over the nose and tail of the helicopter at the 180° and 0° azimuth stations. Moreover the ratio of blade lift to required driving torque becomes substantially higher at the advancing and the retreating blade positions than at the 0° and 180° positions. Rotor efficiency might be improved if the ratio of lift to driving torque throughout the azimuth were substantially constant. This would require a reduction in the loading at the 90° and 270° azimuth stations and an increase in blade loading at the 0° and 180° azimuth stations. Attempts of the type described above have been made to achieve this objective in the past, but each has required the addition of heavy and complicated hardware to the present rotor control system. My objective is to achieve this rotor efficiency improvement without the need of additional blade control hardware and I therefore investigated whether aerodynamic loading, which could also be called air loading of the blade could be utilized to produce/or approach this blade load equalization objective and I have arrived at a helicopter blade and rotor which accomplishes this objective. It is believed that one's understanding of the construction and operation of my blade and rotor will best be understood by a review of the study which I made which led me to the construction of my preferred embodiment. To assist in the understanding of this explanation, I call attention to FIGS. 2a, 2b and 2c in which FIG. 2a shows the conventional or baseline rotor used in modern helicopters and which is torsionally noncompliant. FIG. 2b shows a torsionally compliant rotor with a swept tip but without blade axes offset, and FIG. 2c shows a torsionally compliant rotor with swept tip and with blade axes offset as described in greater particularity hereinafter.

My objective was to determine whether torsional deflection of the blade could be used to change the angle of attack of the blade over the nose and tail to increase blade loading and correspondingly reduce the angle of attack at the 90° and 270° azimuth stations to reduce blade loading/to thereby provide a rotor of greater efficiency requiring less power to drive it. I first made an analytical investigation of the amount of power required to drive a rotor under various conditions of elastic twist at different rotor harmonic numbers, such as one per rev, two per rev, and three per rev etc., with different degrees of elastic twisting at these various rotor harmonic frequencies, and with the peak elastic twisting occurring at different azimuth stations. A radial distribution of torsional deflection was assumed based on the blade first torsional mode. As a result of this investigation, I determined that minimum horsepower was required to drive the rotor which had two per rev elastic twist in the amount of about plus 2° occurring at the 0° and 180° azimuth positions (tip elastic twist angle = $2° \cos 2\psi$). Such a rotor will hereinafter be called a 2 per rev, fore and aft elastic twist rotor.

Figure 4:
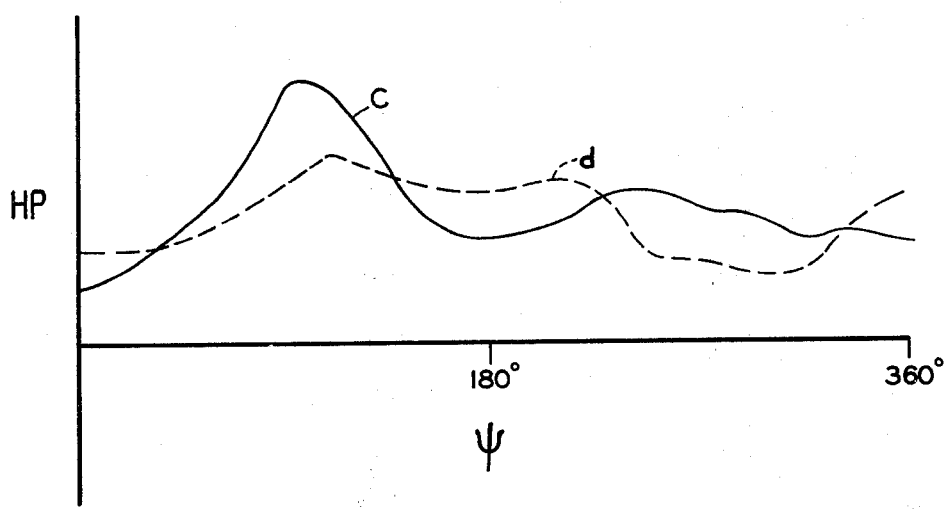
FIG. 4 is related to FIG. 3 and is a graph of horsepower required to drive the baseline rotor throughout all azimuth stations as compared to the horsepower required to drive such a torsionally compliant rotor.
Figure 3:
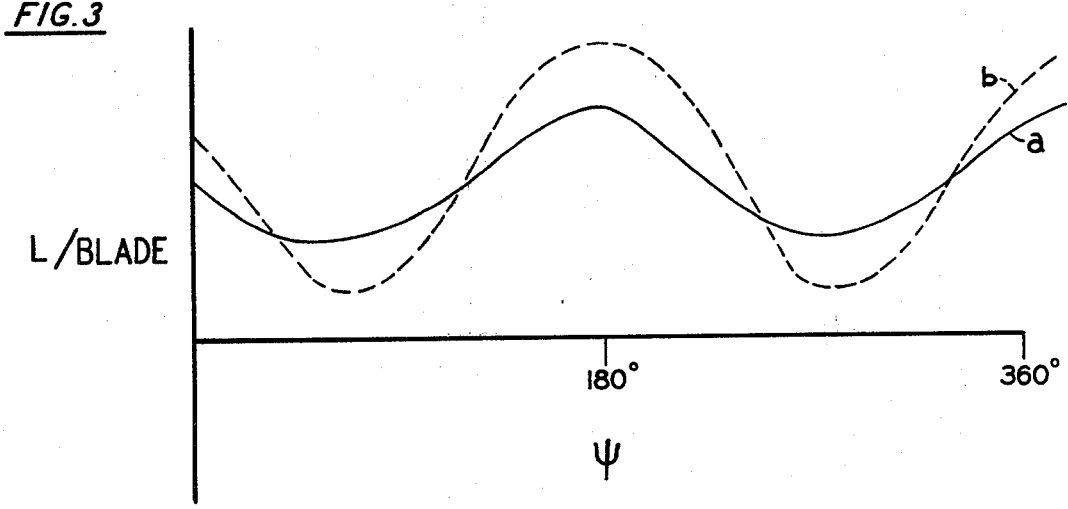
FIG. 3 is a graph of blade lift plotted against azimuth station to compare the total lift generated by a baseline rotor using blades of the type shown in FIG. 2a and a rotor utilizing compliant twist blades producing 2/rev, fore and aft, blade torsional deflection.

FIG. 3 which shows a graph of blade lift plotted against azimuth for a conventional rotor (curve a) and a rotor with 2 per rev, fore and aft torsional deflection (curve b) respectively, and, while these curves are not coincident it can be shown from the FIG. 3 graph that the total lift generated by the rotor with 2 per rev fore and aft elastic twist is the same as the total lift generated by the baseline or conventional rotor. Referring to FIG. 4, however, which is a graph of horsepower required to drive the baseline rotor and a rotor with 2/rev, fore and aft torsional twist or deformation plotted against azimuth, and illustrated by curves c and d, respectively, it can be shown by comparing the total areas under curves c and d, which represent the horsepower required to drive the rotor through full azimuth, that the power required is less for the torsionally compliant rotor than for the FIG. 2a baseline rotor. It is therefore evident that total power required to drive a helicopter rotor can be reduced if we can effect two per rev, fore and aft torsional twist in our blades and that this saving in driving power can be achieved without loss of total rotor lift. Power savings of between 4 and 8% which are considered substantial were predicted for advance ratios of 0.3 to 0.4 and blade loading values of between 0.07 and 0.10. Two per rev fore and aft elastic twist amplitudes of 0, 1, 2 and 3° were examined. Maximum power savings were predicted to occur with approximately 2 degrees of two per rev torsional response phased to increase pitch at azimuths 0° and 180°.

To this point my study had demonstrated that by utilizing two per rev oscillatory torsional twist of about 2° phased to increase pitch at the 0° and 180° azimuth stations, with corresponding reduction of pitch at the 90° and 270° azimuth stations, the power to drive the rotor is considerably reduced during normal helicopter flight operation. Having thus demonstrated the benefits to be gained by a blade and rotor which so operates, I then investigated whether a blade could be produced which would have two per rev fore and aft torsional deflection without the need for added hardware to bring about this torsional deflection but which, rather, might rely upon blade airloading to produce this desired torsional deflection.

I first investigated the possibility of producing such a blade by varying blade camber but was unsuccessful in this regard. I then investigated the prospects of chordwise displacement of some of the blade axes to determine whether selective positioning of certain blade axes could produce the desired torsional deflection due to aerodynamic airloading of the blade. The process used to select the relative chordwise positioning of the blade axes, the spanwise region of the blade within which to offset blade axes and the required blade torsional stiffness is discussed below.

I first investigated whether the airload acting on the blade was such that it could be used with selectively offset axes to produce the desired two per rev, fore and aft torsional deflection. The results of this study are shown in FIG. 5 in which curves 1, 2, 3 and 4 are a plot of the airload acting on the blade throughout the full rotor azimuth at 99%, 80%, 75%, and 68% of blade radius or span, respectively, under conventional helicopter operating conditions. By observing FIG. 5 it will be noted that curve 1 demonstrates that the airloads at the blade tip are approximately varying one per rev and therefore the desired two per rev deflection could not be aerodynamically induced by airloads acting on the blade tip. Considering curves 2, 3 and 4, however, it will be observed that at these radial inboard stations between 68% and 80% of the blade span or radius, airloading is maximum at 0° and 180° azimuth and mimimum at 90° and 270° azimuth so that at these blade span stations, airloading could be utilized to produce the desired two per rev torsional deflection. The FIG. 5 graph demonstrates that the desired two per rev airloads are available to us between the 68% and 80% blade radial stations and, as a practical matter, there will be useful airloads to produce the desired torsional deflection between the 60% and 86% radial blade stations.

My investigation then led me to determine whether this favorable airloading at the span stations shown in FIG. 5 could be utilized to act upon a helicopter blade with selectively positioned axes so as to produce the desired two per rev, fore and aft torsional deformation of the blade.

Figure 6A:
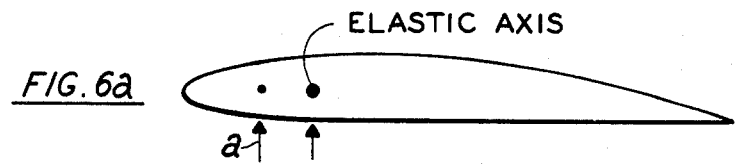
FIG. 6a is a schematic showing of a cross section of a helicopter blade in static condition to illustrate the elastic axis.
Figure 6B:
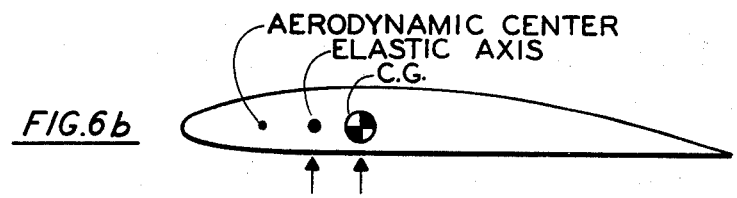
FIG. 6b is a schematic showing of a cross section of a rotating helicopter blade to illustrate blade center of gravity, elastic axis and aerodynamic center.
Figure 6C:
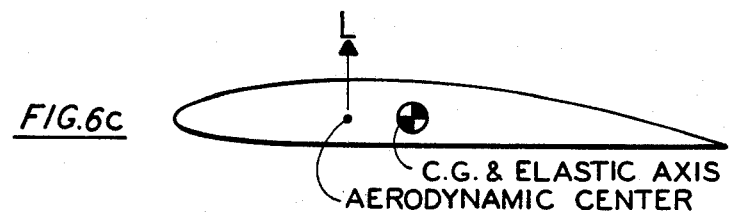
FIG. 6c is a schematic showing of my preferred torsionally compliant blade showing a section of the blade for which the aerodynamic center or lift axis is positioned forward of coincident center of gravity and elastic axes.

The axes which have an effect upon blade twisting and which therefore were available to me in this consideration, are those illustrated in FIGS. 6a, 6b, and 6 c. FIG. 6a shows a static blade with an elastic axis as indicated. The elastic axis is the axis at which, if we press upwardly on the bottom of the blade, we will produce pure flatwise bending motion in the blade rather than a combination of flatwise bending and torsional deflection of the blade as would have occurred if we pressed upwardly on the bottom of the blade on either side of the elastic axis. We can accordingly make the static FIG. 6a blade deflect torsionally by applying pressures to it along the blade chord at locations offset from the elastic axis, for example, as illustrated by load vector a. When the blade is rotating, as illustrated in FIG. 6b, due to the action of centrifugal force, the blade center of gravity (cg) in such a rotating blade controls the position about which the blade will twist to a greater degree than does the position of the elastic axis and it will be understood that a lifting force applied upwardly forward of each will produce torsional deflection of the blade in the FIG. 6b configuration in a clockwise direction. In my preferred embodiment, I make the elastic axis and the center of gravity axis of the blade coincident as shown in FIG. 6c and, during blade rotation, the airloads acting on the FIG. 6c blade will produce a lift vector L acting through the blade aerodynamic center to therefore impose a clockwise moment upon the blade to cause it to twist in a clockwise direction about the coincident blade c.g. and elastic axis.

Considering the FIG. 6c axes location and the FIG. 5 blade airloading variation, it will be evident that a blade of the FIG. 6c configuration will be caused to deflect torsionally maximally at the 180° and 0° azimuth stations of the rotor, thereby causing the blade to be of maximum increased or positive pitch or twist at these azimuth locations, and torsional response will cause the blade to nose down or reduce twist or pitch maximally at the 90° and 270° azimuth stations.

Figure 7:
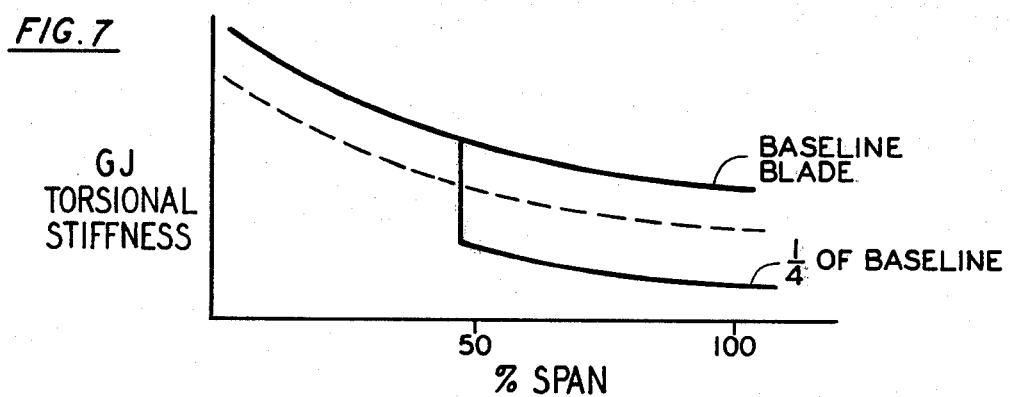
FIG. 7 is a graph showing the torsional stiffness of my preferred blade throughout the blade span.

My investigation revealed that to effectively accomplish the desired two per rev, fore and aft torsional deflection due to aerodynamic airloading it is important that the rotor blade be torsionally compliant, that is, torsionally flexible. Torsional compliance can be designed or built into a blade in many ways but my investigation led me to the preferred construction shown in FIG. 2c in which the control system stiffness imparting pitch change motion to the blade through pitch horn 20 is fabricated to be about two-thirds of the stiffness of the control system for baseline rotor of FIG. 2a. In addition, and as best shown in FIG. 7, which is a plot of torsional stiffness versus percent blade span, my preferred blade is fabricated so that the torsional stiffness between the 50% span to the blade tip is about ¼ that of the baseline blade torsional stiffness, whereas radially inboard thereof my preferred blade is of conventional stiffness. For the baseline blade, as depicted in FIG. 2a, the uncoupled torsional mode frequency is about 5.2 per revolution whereas the uncoupled torsional mode frequency of the compliant rotor having the torsional stiffness pattern shown in FIG. 8 about 3.5 cycles per revolution. A blade construction which provides this torsional stiffness illustrated in FIG. 7 is a torsionally compliant, ie flexible, blade able to respond to the two per rev airloads acting thereon so as to produce the desired two per rev torsional deflection, twist or pitch change so as to be maximum in positive elastic pitch over the nose and tail and maximum in negative elastic pitch at the 90° and 270° azimuth stations. While FIG. 7 discloses my preferred compliant blade torsional stiffness pattern in solid lines, it should be borne in mind that other torsionally compliant blades could be used. For example, it would have been possible to reduce the torsional stiffness of my blade throughout its full span so that the torsional stiffness thereof compared to baseline blade torsional stiffness would be as shown on the dotted line in FIG. 7, with the same result on the dotted line in FIG. 7, with the same result and uncoupled torsional mode frequency of 3.5 cycles per revolution.

Those skilled in the art will realize that torsional stiffness along the span of the blade can be controlled in many ways, for example, the wall thickness or material used in the blade spar may be varied to produce this torsional stiffness pattern and, in a composite blade, the number of layers of bonded material and layer or roving orientation lend themselves nicely to accomplishing blade torsional stiffness variation of any desired pattern.

I next approached the problem of determining the amount of axes offset and while, as best shown in FIG. 2c, in my preferred embodiment, I placed my aerodynamic center axis about 15% of the chord dimension forward of the coincident center of gravity and elastic axes throughout the portion of the blade span which lent itself best to the two per rev, fore and aft torsional deflection, namely between 63% and 86% of the blade radius or span, I could have used a greater amount of offset of these axes over a lesser range of blade span but my preferred FIG. 2c embodiment was deemed to be the best from an ease of manufacture and blade stability standpoint. Power savings of from 2% to 15% relative to a conventional (non-compliant) rotor were predicted for this rotor during operation at advance ratios between 0.3 and 0.4 and blade loading values of from 0.085 to 0.115.

Figure 8:
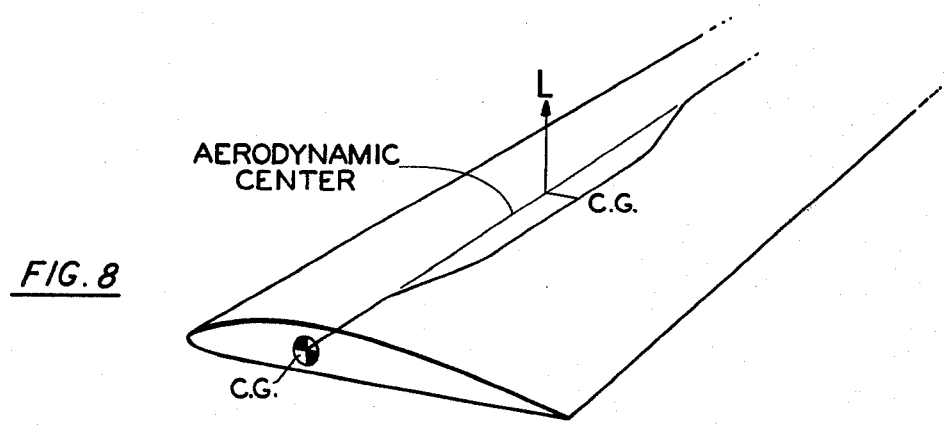
FIG. 8 is a schematic showing of a helicopter blade illustrating one method of producing desired axes offset.

It should be borne in mind, however, that our torsionally compliant blade could as well have been made as shown in FIG. 8 so as to be of conventional shape but with the aerodynamic center axis, which could also be called lift axis, extending along a straight line as shown and with the center of gravity and elastic axes moved toward the blade trailing edge between the optimum radial stations described above.

Realizing that positioning the blade aerodynamic center forward of the coincident center of gravity and elastic axes could conceivable introduce blade instability problems, even if only over a portion of the blade span, I have provided a 20° rearward sweep in the outer 10% of the blade span so as to overcome any such instability.

In my preferred embodiment blade, it is important that the blade be both torsionally compliant as described above and have axes offset as shown and described in connection with FIG. 2c. If I had attempted to use a blade which was not torsionally compliant and attempted to produce the desired torsional deflection or twisting by axes offset only, the fabrication of such a blade would present some severe problems and such a construction would aggravate blade instability problems. If, on the other hand, a blade of very much increased torsional flexibility were used in combination with an axes offset less than that shown and described in connection with FIG. 2c blade, such a blade would have a very low torsional frequency and unacceptably high levels of torsional response.

Figure 9:
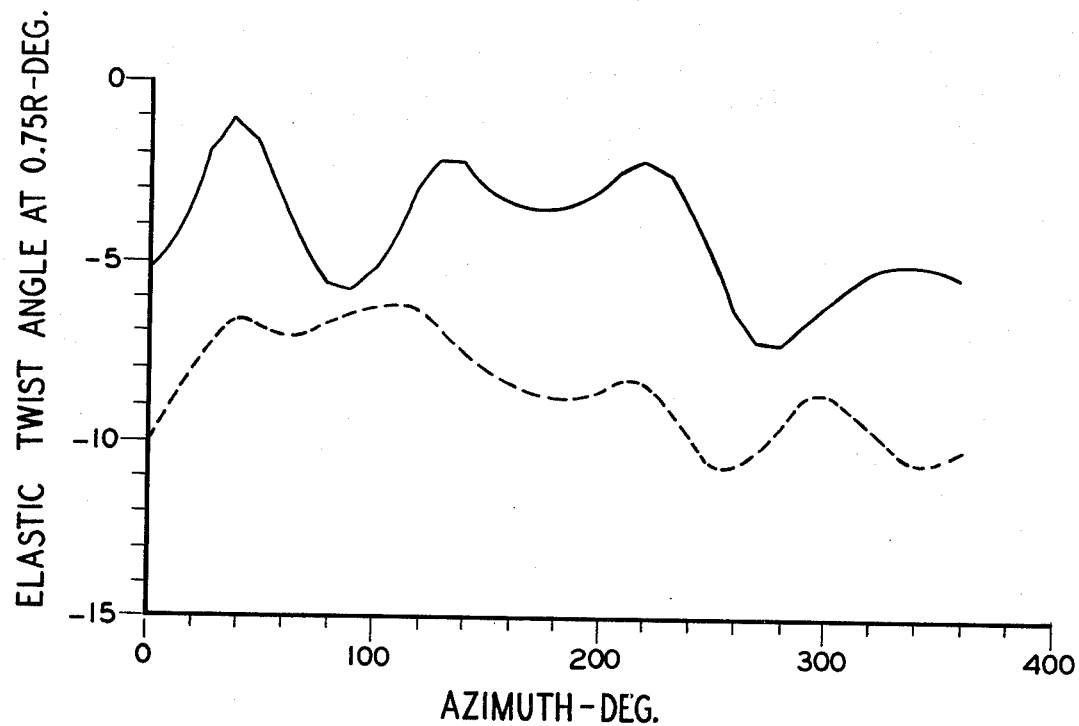
FIG. 9 is a graph illustrating the elastic twist angle at a selected radial station of a compliant helicopter blade of the type taught herein with both axes offset and tip sweep as compared to such a torsionally compliant blade with tip sweep only and without axes offset.
Figure 10:
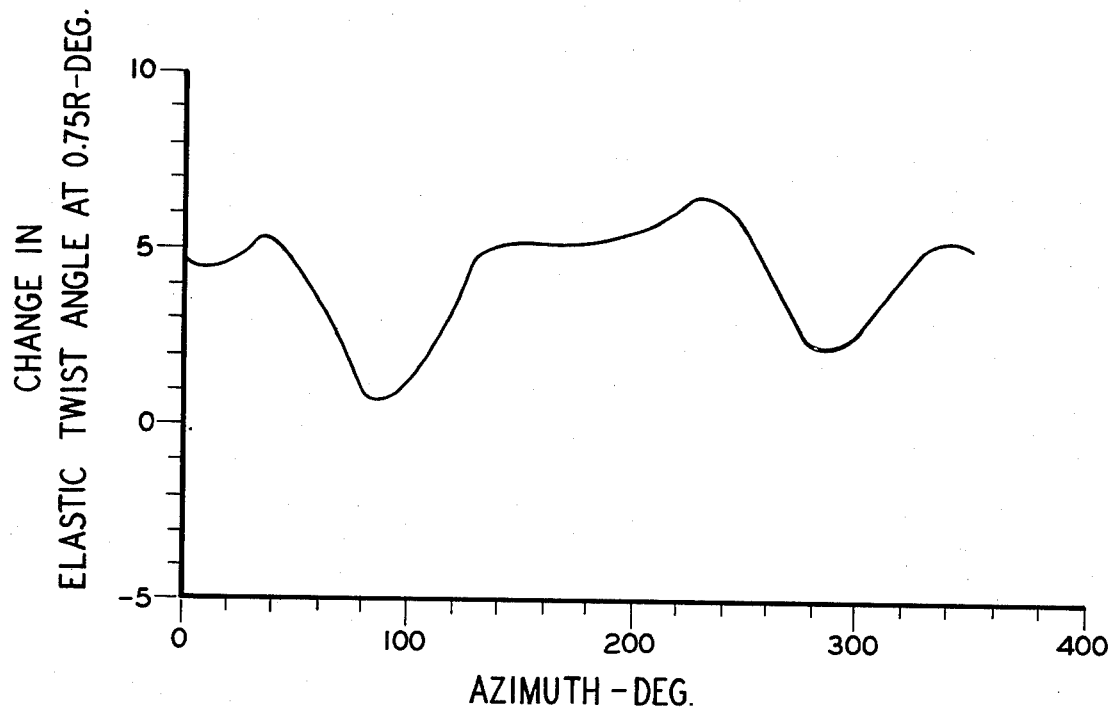
FIG. 10 is an illustration of the difference in elastic twist angle generated by the two blades illustrated in FIG. 9 to illustrate that my axes offset teaching produces elastic twist deformation of a two per rev variety which is phased to increase blade angle of attack at the selected azimuth stations, namely, fore and aft.

To illustrate the importance of axes offset in my construction, attention is called to FIGS. 9 and 10 wherein, in FIG. 9, the torsional twist achieved in my preferred embodiment (FIG. 2c) is shown by the solid line curve, while the torsional twist for a blade (FIG. 2b) of the same stiffness and tip sweep but without forward aerodynamic center is shown in the dotted line curve. Accordingly, the difference between the two curves of FIG. 9 shows the effectiveness of the forward aerodynamic center in producing two per rev fore and aft torsional response as illustrated in the FIG. 10 graph.

In the manner just described, I have produced a helicopter blade of desired torsional compliance or flexibility and with selective chordwise offset of its aerodynamic center from coincident center of gravity and elastic axes over a selected region of blade span so as to produce two per rev fore and aft torsional deflection of the blade induced purely by airloads imposed thereon during rotation of the helicopter rotor.

I wish it to be understood that I do not desire to be limited to the exact details of construction shown and described, for obvious modifications will occur to a person skilled in the art.

I claim:

1. A helicopter blade fabricated to be torsionally compliant throughout a portion of the blade span and so that the blade aerodynamic center axis is selectively positioned chordwise forward of the blade center of gravity and elastic axes for a selected portion of the blade span to thereby produce two per rev torsional twisting of the blade due to aerodynamic loading thereof in operation and thereby selectively vary the blade angle of attack.

2. A blade according to claim 1 wherein said blade is torsionally compliant throughout the outer half of its span.

3. A blade according to claim 2 wherein said blade is of conventional blade torsional stiffness throughout the inner half of the blade span and one-quarter conventional blade torsional stiffness throughout the outer half of the blade span.

4. A blade according to claim 2 wherein said blade has an uncoupled torsional mode frequency of 3.5 per revolution as a result of torsional stiffness reduction over the outer half of its span.

5. A helicopter blade according to claim 1 which is torsionally compliant throughout the full blade span and whose uncoupled torsional mode frequency is 3.5 per revolution as a result of its full span torsional stiffness reduction.

6. A helicopter blade according to claim 1 wherein said selected portion of the blade span in which the blade aerodynamic center axis is positioned forward of the blade center of gravity and, elastic axes throughout a selected span range at a station inboard of the blade tip and outboard of the blade root.

7. A helicopter blade according to claim 6 wherein said selected blade span portion is between about 0.60 and 0.86 blade span.

8. A helicopter blade according to claim 7 wherein said aerodynamic center axis is positioned forward of said center of gravity and said elastic axes a distance equal to about 15% ± 5% of blade chord dimension.

9. A helicopter blade according to claim 1 wherein the blade aerodynamic center axis is positioned 15% ± 5% of the chord dimension forward of the blade center of gravity and elastic axes for the selected portion of the blade span between about 0.60 and 0.86 blade span, and including a rearwardly swept blade tip with 20° sweep and extending for about the outer 10% of the blade span.

10. A helicopter having:
A. a fuselage,
B. a lift rotor suspended from said fuselage for rotation about an axis of rotation and having:
(1) at least two helicopter blades each fabricated to be torsionally compliant throughout a portion of the blade span and so that the blade aerodynamic center axis is selectively positioned chordwise forward of the blade center of gravity and elastic axes throughout a selected portion of the blade span to thereby produce two per rev positive torsional deflection at the 0° and 180° azimuth stations and negative torsional deflection at the 90° and 270° azimuth stations to thereby selectively vary the blade angle of attack and loading.

* * * * *

UNITED STATES PATENT OFFICE
CERTIFICATE OF CORRECTION

PATENT NO. : 4,130,377
DATED : December 19, 1978
INVENTOR(S) : Robert Hugh Blackwell, Jr.

It is certified that error appears in the above-identified patent and that said Letters Patent are hereby corrected as shown below:

Column 6, Line 9  Delete "with the same result on the dotted"

Column 6, Line 10 Delete "line in Fig. 7,"

Signed and Sealed this

Fifth Day of June 1979

[SEAL]

Attest:

RUTH C. MASON
Attesting Officer

DONALD W. BANNER
Commissioner of Patents and Trademarks